United States Patent
Tseng

(10) Patent No.: US 8,258,928 B2
(45) Date of Patent: Sep. 4, 2012

(54) RFID SYSTEM AND RFID TAG THEREOF

(75) Inventor: Yao-Yi Tseng, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 786 days.

(21) Appl. No.: 12/398,955

(22) Filed: Mar. 5, 2009

(65) Prior Publication Data

US 2009/0289768 A1    Nov. 26, 2009

(30) Foreign Application Priority Data

May 22, 2008    (TW) ................. 97118886 A

(51) Int. Cl.
    *G08C 19/12*    (2006.01)

(52) U.S. Cl. .......... 340/10.4; 340/5.1; 340/5.2; 340/5.3; 340/5.4; 340/5.5; 340/10.1; 340/10.2; 340/10.3; 340/10.5; 340/572.1; 340/572.2; 340/572.3; 340/572.4; 340/572.5; 340/572.6; 340/572.7; 340/572.8; 340/870.16; 340/870.17; 235/375; 235/376; 235/380; 235/383; 235/385

(58) Field of Classification Search ........ 340/10.1–10.5, 340/572.1–572.9, 5.1–5.5, 870.16–870.17; 235/375–385

See application file for complete search history.

(56) References Cited

U.S. PATENT DOCUMENTS

2004/0036626 A1 * 2/2004 Chan et al. ................ 340/870.17
2007/0057771 A1 * 3/2007 Tomioka .................... 340/10.1

* cited by examiner

*Primary Examiner* — George Bugg
*Assistant Examiner* — Ojiako Nwugo

(57) ABSTRACT

An RFID tag is provided. The RFID tag includes an emitting module, a temperature detecting circuit and a tag chip. The temperature detecting circuit produces a time signal according to a surrounding temperature, wherein the time signal changes with the surrounding temperature. The tag chip is electrically connected to the temperature detecting circuit and the emitting module, wherein the time signal is transmitted via the emitting module.

18 Claims, 9 Drawing Sheets

RFID SYSTEM AND RFID TAG THEREOF

CROSS REFERENCE TO RELATED APPLICATIONS

This Application claims priority of Taiwan Patent Application No. 097118886, filed on May 22, 2008, the entirety of which is incorporated by reference herein.

BACKGROUND OF THE INVENTION

1. Field of the Invention

The present invention relates to an RFID tag, and in particular relates to an RFID tag having a temperature detecting function.

2. Description of the Related Art

RFID (Radio Frequency Identification) technology is popularly utilized in logistics management to track, monitor and manage storage. A passive RFID tag is popular for its low cost and small volume, wherein a reader emits a tag request signal to induce the RFID tag to generate a tag signal.

However, some goods need to be stored under a particular temperature environment, such as frozen foods or red wines, and conventional RFID tags do not provide a temperature detection function. Conventionally, a passive RFID tag requires minimal electricity, and does not generate a temperature detecting signal.

BRIEF SUMMARY OF THE INVENTION

A detailed description is given in the following embodiments with reference to the accompanying drawings.

An RFID tag is provided. The RFID tag comprises an emitting module, a temperature detecting circuit and a tag chip. The temperature detecting circuit produces a time signal according to a surrounding temperature, wherein the time signal changes with the surrounding temperature. The tag chip is electrically connected to the temperature detecting circuit and the emitting module, wherein the time signal is transmitted via the emitting module.

Because a conventional passive RFID tag does not have sufficient electricity to directly provide a temperature detection function, in the embodiment of the invention, the RFID tag provides a time signal containing a temperature message. The reader receives the time signal, and decodes the temperature message, and generates a temperature signal. The passive RFID tag of the invention, thus, can monitor temperature.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
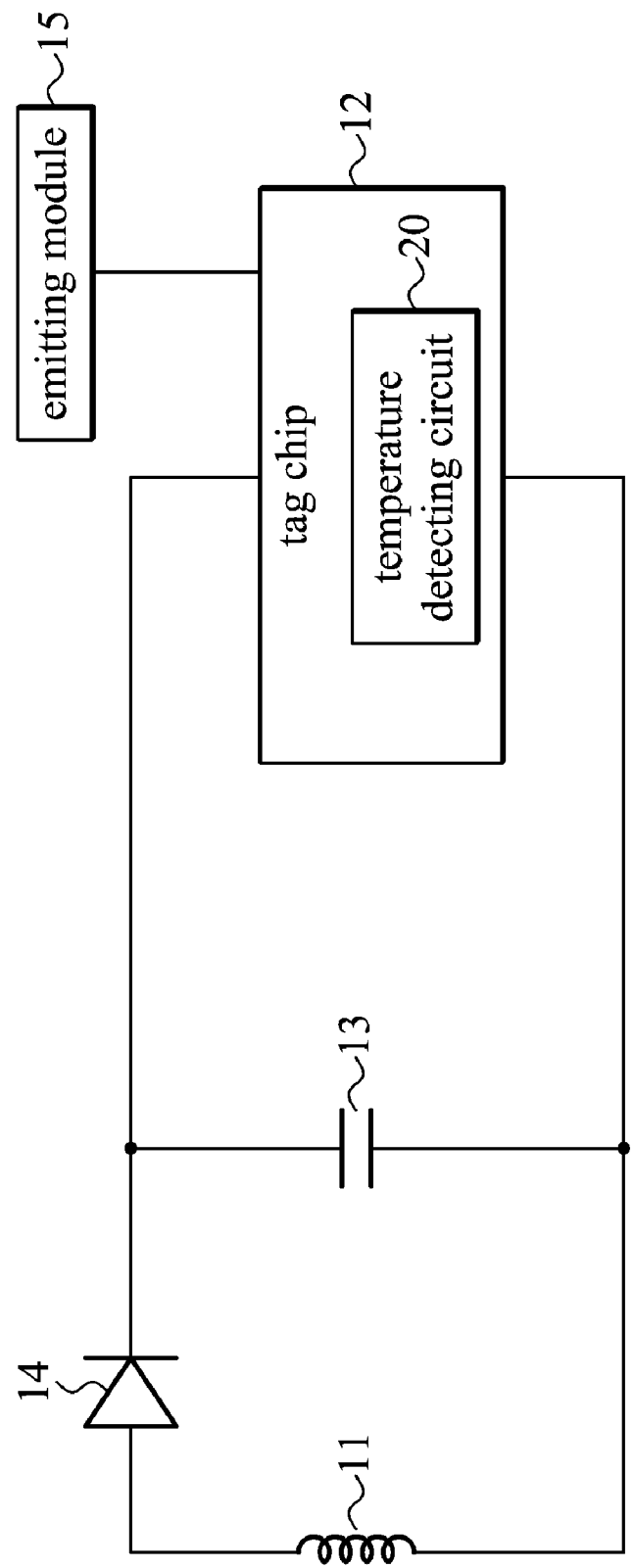
FIG. 1a shows an RFID tag of an embodiment of the invention.
Figure 1B:
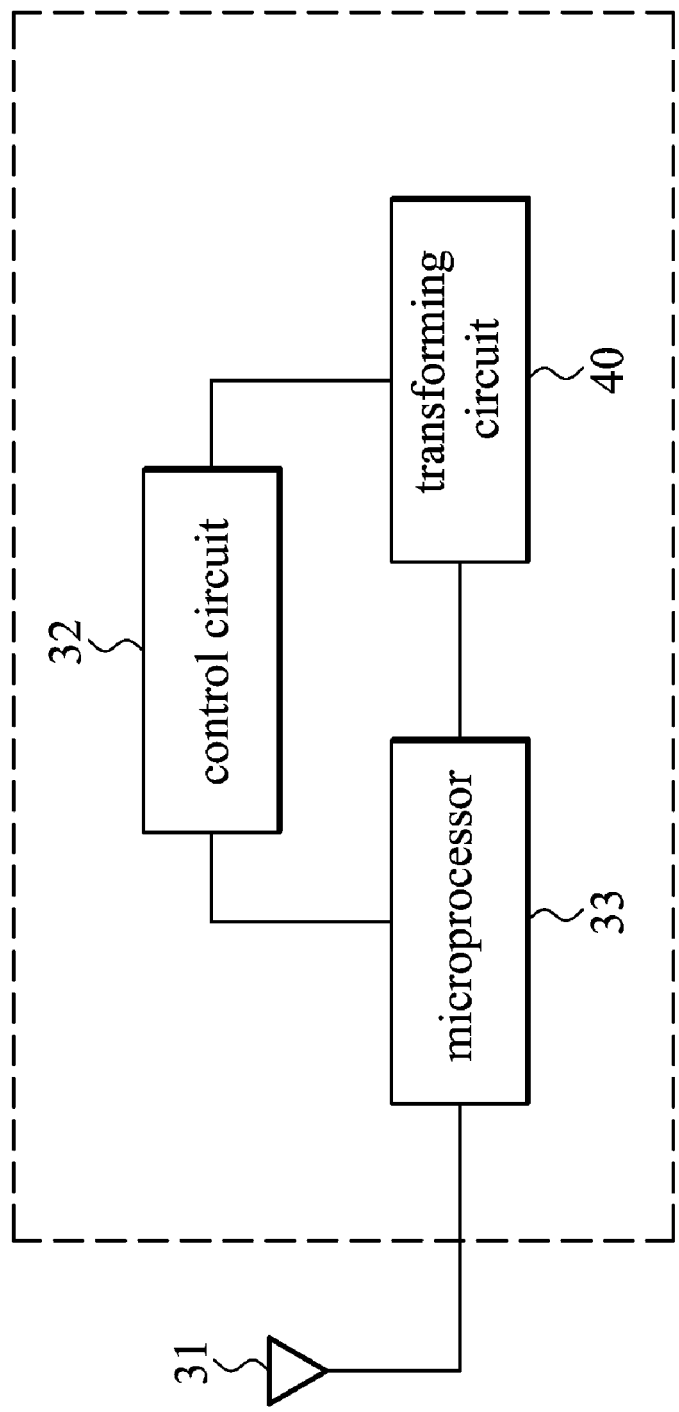
FIG. 1b shows a reader of the embodiment of the invention.

FIGS. 1a and 1b show an RFID tag 10 and a reader 30 of an RFID system of an embodiment of the invention. The RFID tag 10 comprises a tag antenna 11, a tag chip 12, a diode 14, a capacitor 13, an emitting module 15 and a temperature detecting circuit 20. The diode 14 and the capacitor 13 rectify and filter an induced current generated by the tag antenna 11 to provide electricity to the tag chip 12 and the temperature detecting circuit 20. In one embodiment, the diode 14 and the capacitor 13 are incorporated in the tag chip 12. In one embodiment, the temperature detecting circuit 20 is also incorporated in the tag chip 12. The reader 30 comprises a reader antenna 31, a control circuit 32, a microprocessor 33 and a transforming circuit 40.

When the control circuit 32 emits a temperature request signal via the reader antenna 31, the tag antenna 11 receives the temperature request signal, and the temperature request signal induces the tag chip 12 controlling the temperature detecting circuit 20 to generate a time signal according to a surrounding temperature. The tag chip 12 controls the emitting module 15 emitting the time signal. Next, the time signal is received by the reader antenna 31, processed by the microprocessor 33, and enters the transforming circuit 40. The transforming circuit 40 transforms the time signal into a temperature signal.

Because a conventional passive RFID tag does not have sufficient electricity to directly provide a temperature detection function, in the embodiment of the invention, the RFID tag provides a time signal containing a temperature message. The reader receives the time signal, and decodes the temperature message, and generates a temperature signal. The passive RFID tag of the invention, thus, can monitor temperature.

When the control circuit 32 emits a tag request signal via the reader antenna 31, the tag antenna 11 receives the tag request signal, and the tag request signal induces the tag chip 12 to generate a tag signal. The tag chip 12 controls the emitting module 15 emitting the tag signal. The tag signal is received by the reader antenna 31, processed by the microprocessor 33, and read by the control circuit 32.

Figure 2:
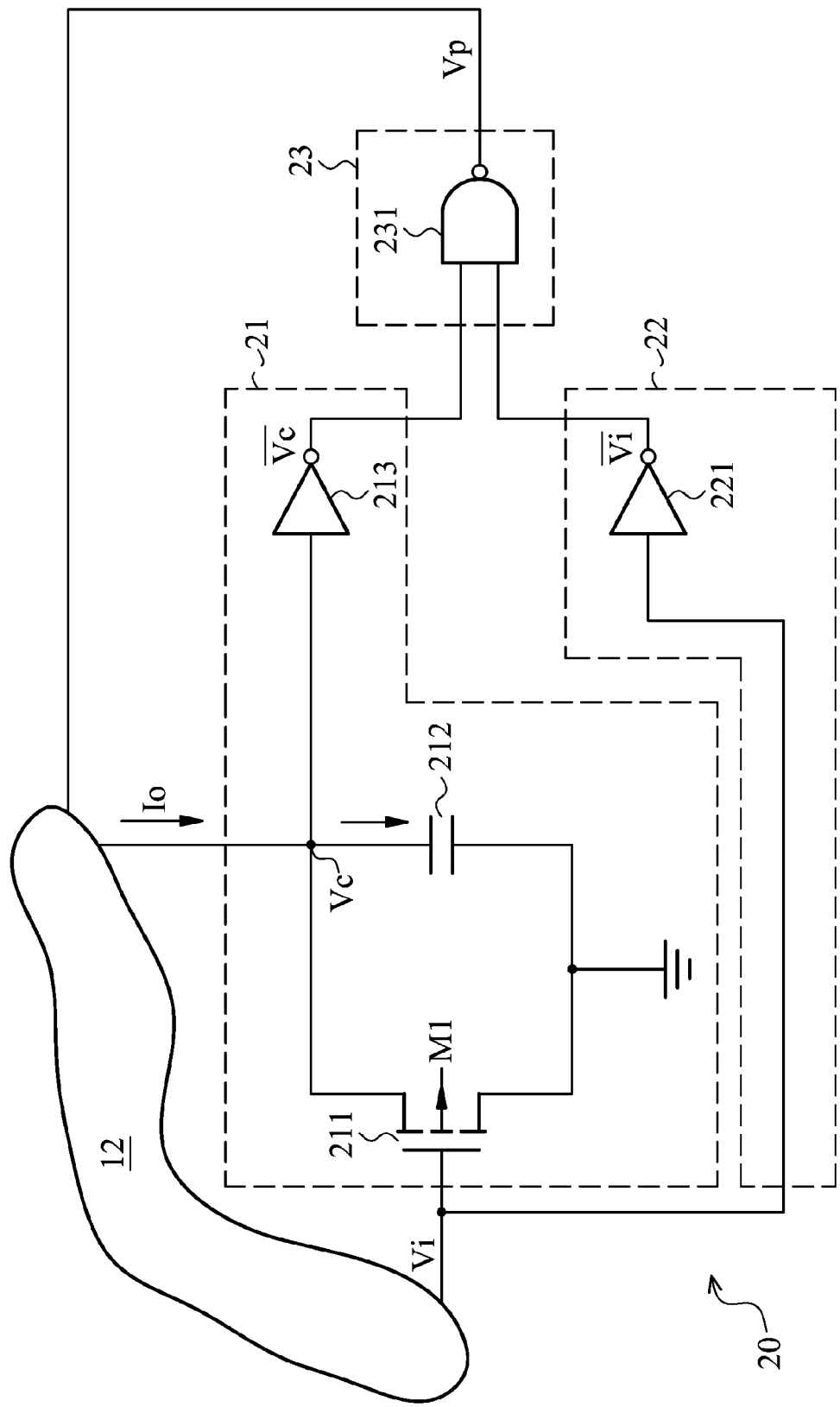
FIG. 2 shows a temperature detecting circuit of the embodiment of the invention.
Figure 3A:
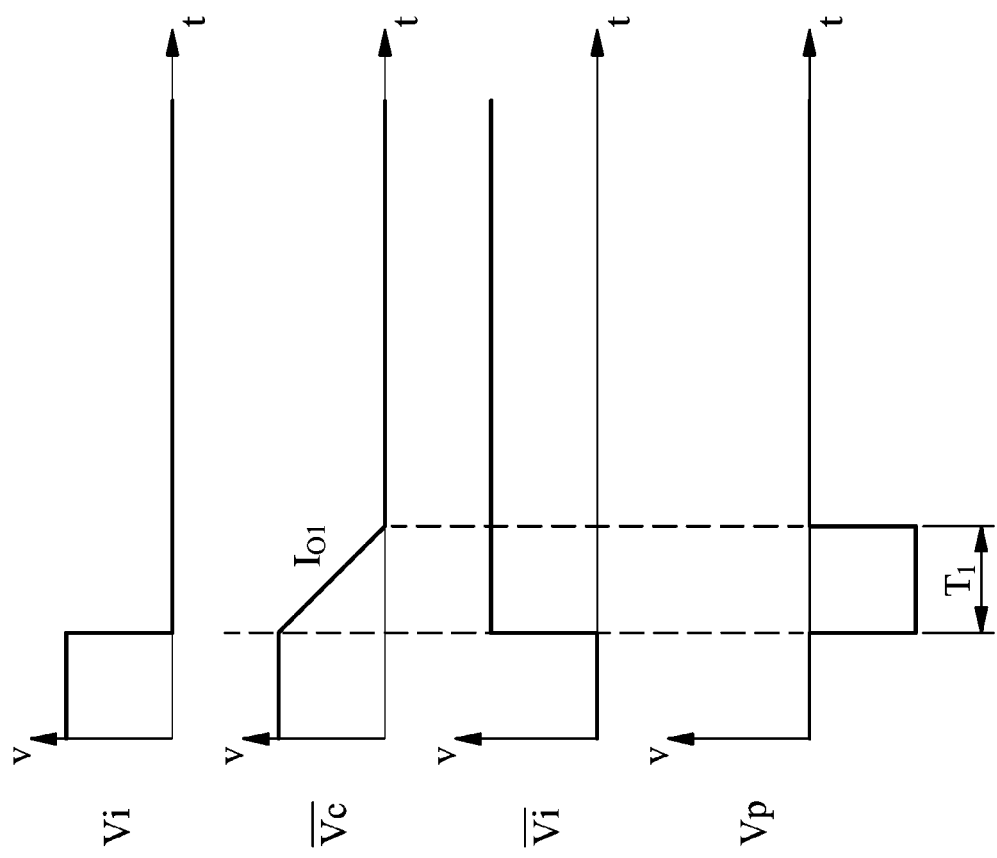
FIGS. 3a and 3b are sequence diagrams of the temperature detecting circuit of the embodiment of the invention.
Figure 3B:
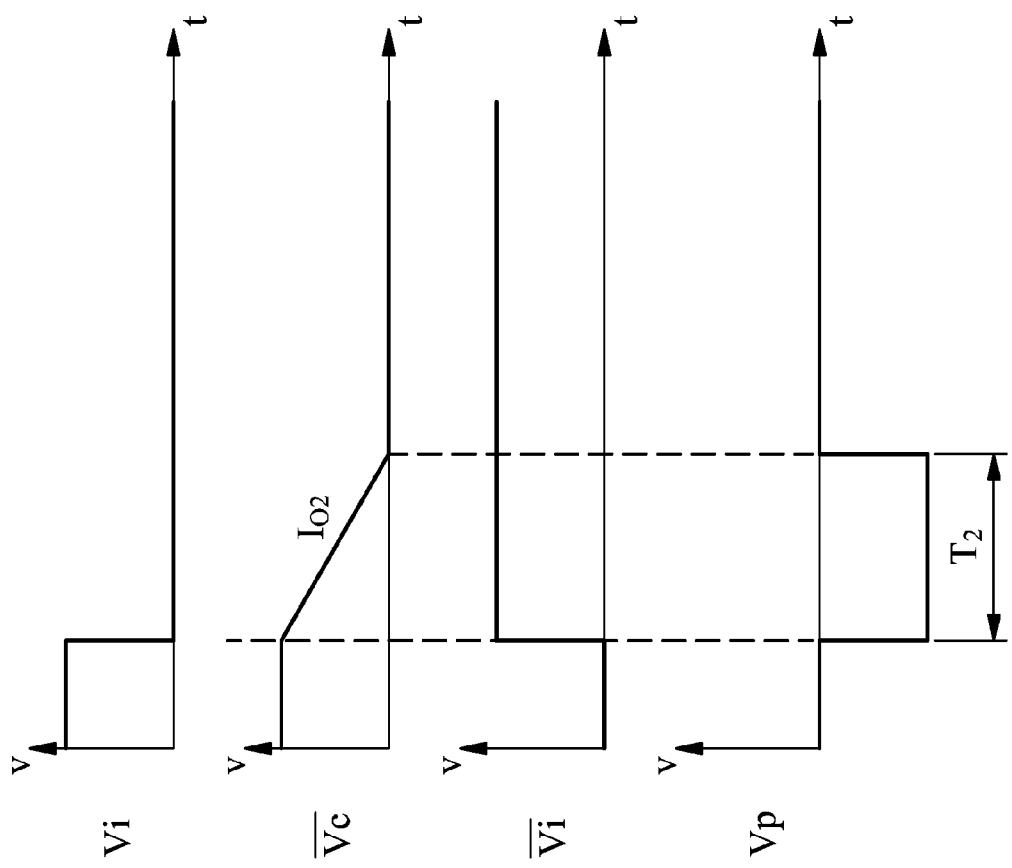

FIG. 2 shows the temperature detecting circuit 20 of the embodiment of the invention, comprising a temperature retardation unit 21, a reference unit 22 and a comparison unit 23. The comparison unit 23 is electrically connected to the temperature retardation unit 21 and reference unit 22. The tag chip 12 is electrically connected to the temperature retardation unit 21, the reference unit 22 and the comparison unit 23. With reference to FIGS. 3a and 3b, when the tag chip 12 sends a pulse signal $V_i$ into the temperature retardation unit 21 and the reference unit 22, the temperature retardation unit 21 generates a retardation signal $\nabla_c$ according to the pulse signal $V_i$, the reference unit 22 generates a reference signal $\nabla_i$ according to the pulse signal $V_i$, and the comparison unit 23 generates the time signal $V_p$ according to the retardation signal $\nabla_c$ and the reference signal $\nabla_i$. The time signal $V_p$ has a time period, the time period changes with the surrounding temperature.

With reference to FIG. 2, the temperature retardation unit 21 comprises a field effect transistor 211, a capacitor 212 and a first NOT gate 213, the capacitor 212 and the first NOT gate 213 are electrically connected to the field effect transistor 211. When the pulse signal $V_i$ enters the temperature retardation unit 21, the field effect transistor 211 is cut-off, the tag chip 12 provides an input current $I_o$ to the capacitor 212 to linear charge the capacitor 212. An input voltage $V_c$ is thus provided to the first NOT gate 213. The temperature retardation unit 21 outputs the retardation signal $\overline{V}_c$ when the input voltage $V_c$ exceeds a threshold voltage of the first NOT gate 213. With reference to FIGS. 3a and 3b, the conductivity of the field effect transistor 211 varies with the surrounding temperature, input currents ($I_{o1}$ and $i_{o2}$) are therefore influenced, and the timing is changed when the high potential is changed to the low potential of the retardation signal $\overline{V}_c$. The time periods ($T_1$ and $T_2$) of the time signal $V_p$ is thus changed with the surrounding temperature.

The reference unit 22 comprises a second NOT gate 221, and the pulse signal $V_i$ enters the second NOT gate 221 to be transformed into the reference signal $\overline{V}_i$. The comparison unit 23 comprises a NAND gate 231, and the NAND gate 231 outputs the time signal $V_p$ according to the reference signal $\overline{V}_i$ and the retardation signal $\overline{V}_c$.

Figure 4:
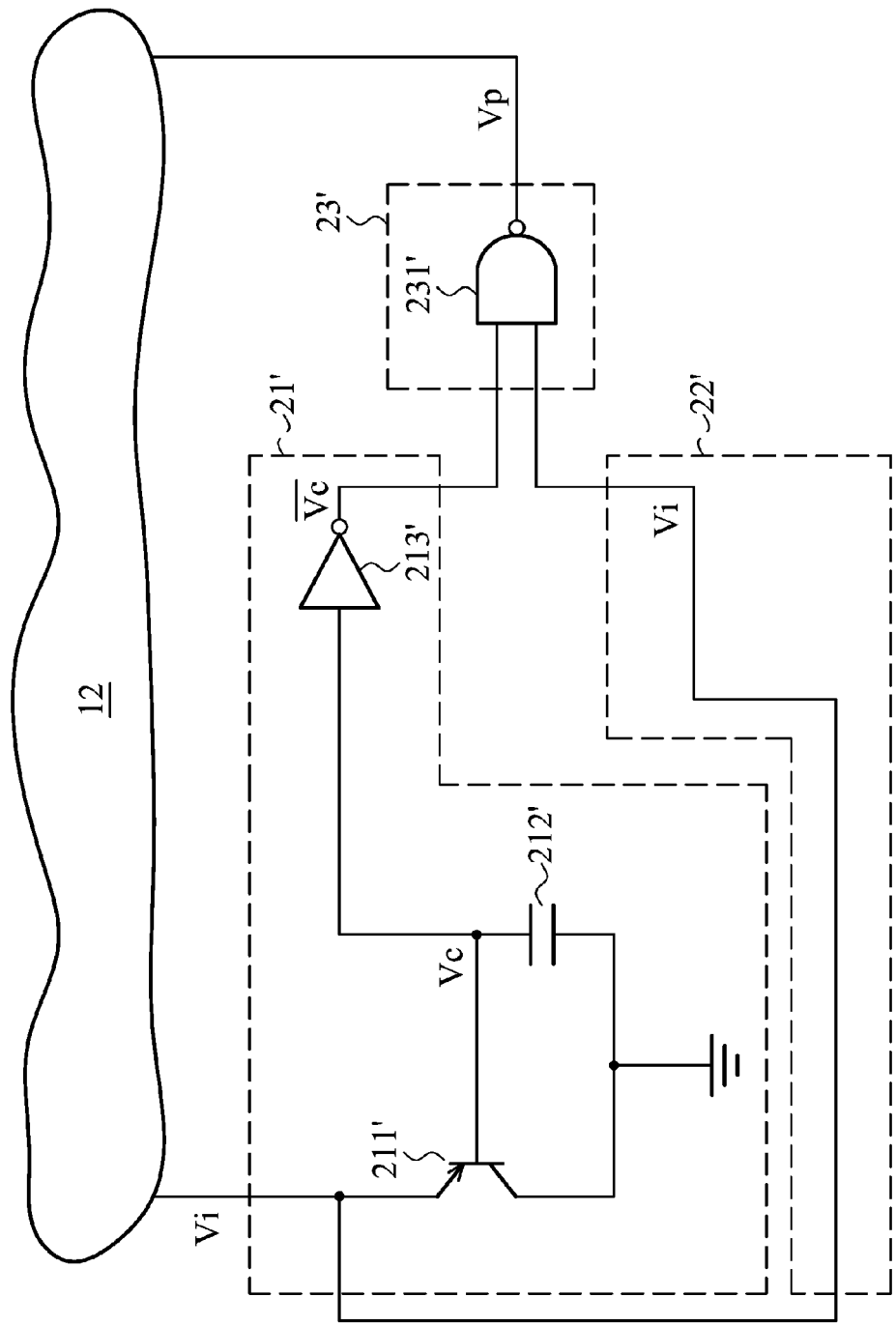
FIG. 4 shows a temperature detecting circuit of another embodiment of the invention.
Figure 5:
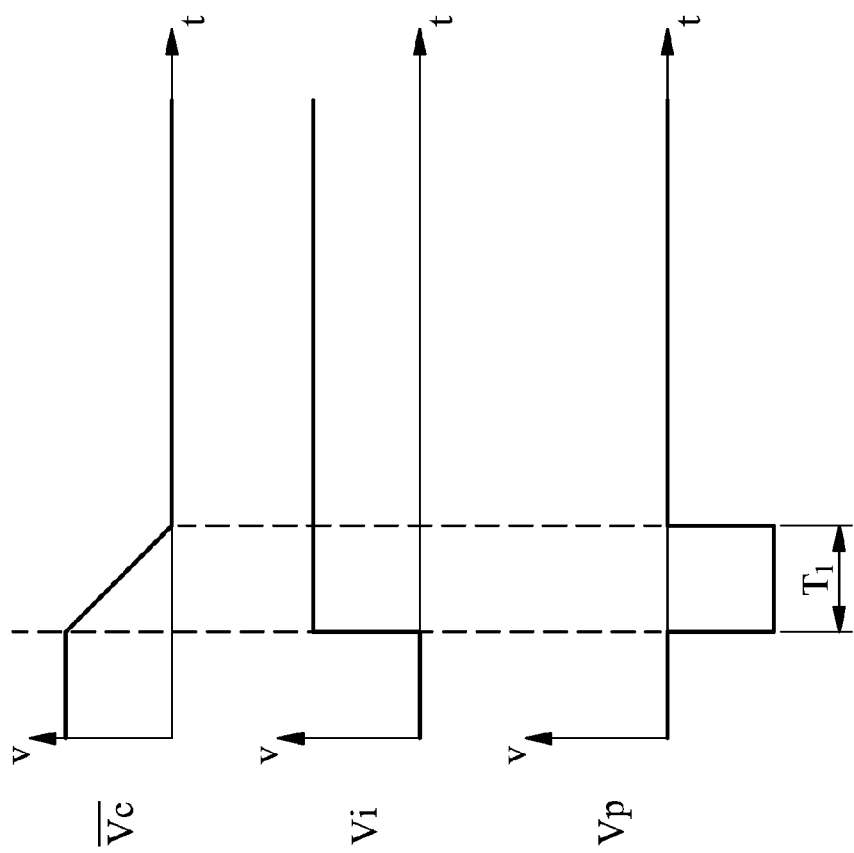
FIG. 5 is a sequence diagram of the temperature detecting circuit of the embodiment of FIG. 4.

FIG. 4 shows a temperature detecting circuit 20' of another embodiment of the invention, comprising a temperature retardation unit 21', a reference unit 22' and a comparison unit 23'. The comparison unit 23' is electrically connected to the temperature retardation unit 21' and reference unit 22'. The tag chip 12'0 is electrically connected to the temperature retardation unit 21', the reference unit 22' and the comparison unit 23'. With reference to FIG. 5, when the tag chip 12 sends a pulse signal $V_i$ into the temperature retardation unit 21' and the reference unit 22', the temperature retardation unit 21' generates a retardation signal $\overline{V}_c$ according to the pulse signal $V_i$, the reference unit 22' generates a reference signal $V_i$ according to the pulse signal $V_i$, and the comparison unit 23 generates the time signal $V_p$ according to the retardation signal $\overline{V}_c$ and the reference signal $V_i$. The time signal $V_p$ has a time period, and the time period changes with the surrounding temperature.

The temperature retardation unit 21' comprises a bipolar transistor 211', a capacitor 212' and a NOT gate 213'. The capacitor 212' and the NOT gate 213' are electrically connected to the bipolar transistor 211'. When the pulse signal $V_i$ enters the temperature retardation unit 21', the bipolar transistor 211' is switched on, the pulse signal $V_i$ provides an input current to the capacitor 212' to linear charge the capacitor 212'. An input voltage $V_c$ is provided to the NOT gate 213'. The temperature retardation unit 21' outputs the retardation signal $\overline{V}_c$ when the input voltage $V_c$ exceeds a threshold voltage of the NOT gate 231'. The comparison unit 23' comprises a NAND gate 231', and the NAND gate 231' outputs the time signal $V_p$ according to the reference signal $V_i$ and the retardation signal $\overline{V}_c$.

In the embodiment of the invention, the temperature detecting circuit is realized by the field effect transistor and the bipolar transistor. However, the invention is not limited thereto. The temperature detecting circuit of the invention can also be realized by other electronic elements or designs.

Figure 6:
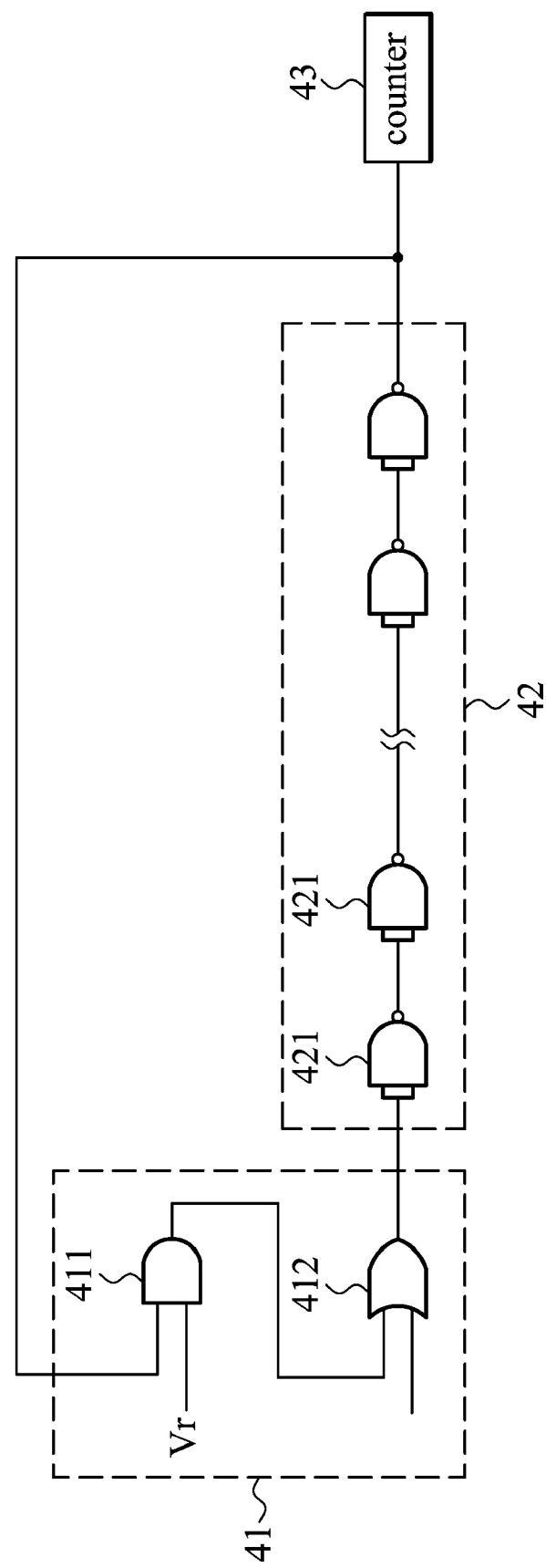
FIG. 6 shows a transforming circuit of the embodiment of the invention.

With reference to FIG. 6, the transforming circuit 40 comprises a logical unit 41, a decaying unit 42 and a counter 43. The logical unit 41 is electrically connected to the decaying unit 42, the decaying unit 42 is electrically connected to the counter 43, the time signal passes the logical unit 41 into the decaying unit 42, the decaying unit 42 reduces the time period of the time signal to generate a feedback signal, the feedback signal is fed back into the logical unit 41, and the counter 43 outputs the temperature signal according to a number of times the feedback signal is fed back.

The decaying unit 42 comprises a plurality of NAND gates 421, and the NAND gates 421 are serially connected to reduce the time period of the time signal and the feedback signal.

The logical unit 41 comprises an AND gate 411 and an OR gate 412, the AND gate 411 is electrically connected to the OR gate 412. The time signal passes the AND gate 412 entering the decaying unit 42. The feedback signal enters the logical unit 41 from the decaying unit 42, enters the AND gate 411, and the AND gate 411 compares the feedback signal with a reference potential $V_r$. If the time period of the feedback signal is not zero, the feedback signal enters the OR gate 412 to be re-fed into the decaying unit 42. If the time period of the feedback signal is zero, the AND gate 411 and the OR gate 412 are disabled.

Figure 7A:
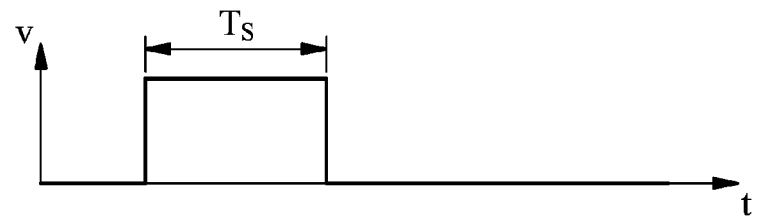
FIGS. 7a-7d show a time signal decay process.
Figure 7B:
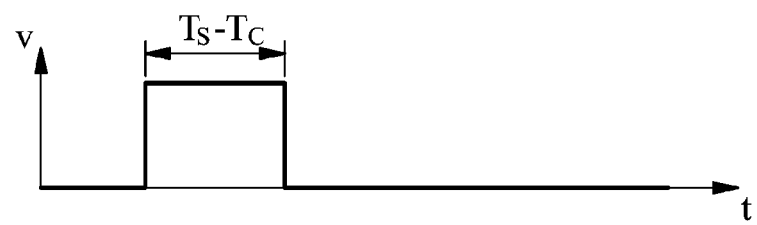
Figure 7C:
Figure 7D:
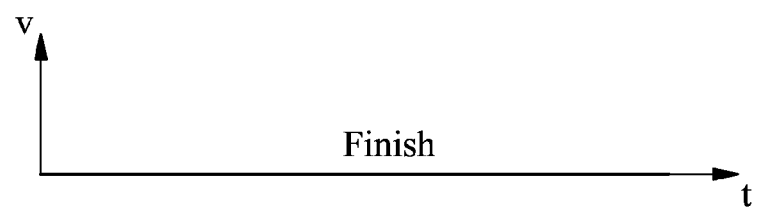

FIGS. 7a-7d show a time signal decay process. With reference to FIG. 7a, when the time signal enters the transforming circuit, the time signal has an initial time period Ts. With reference to FIG. 7b, the time signal enters the decaying unit, and the decaying unit reduces the time period of the time signal to generate the feedback signal. The feedback signal has a time period (Ts-Tc), which is achieved by subtracting the timing reference delay line Tc from the initial time period Ts. With reference to FIG. 7c, after the feedback signal is re-fed into the decaying unit, the feedback signal has the time period (Ts-2Tc). With reference to FIG. 7d, after the feedback signal is re-fed into the decaying unit for several times, the time period of the feedback signal is reduced to zero, and the AND gate 411 and the OR gate 412 are disabled.

In the embodiment of the invention, the temperature detection function is realized by a passive RFID tag. However, the invention is not limited thereto. The design of the invention can also be realized on an active RFID tag with energy saving advantages.

In the embodiment of the invention, the transforming circuit is realized by the logical unit, the decaying unit and the counter. However, the invention is not limited thereto. The transforming circuit can also be realized by other circuit designs.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An RFID system, comprising:
   an RFID tag, comprising:
      an emitting module;
      a temperature detecting circuit, producing a time signal according to a surrounding temperature; and
      a tag chip, electrically connected to the temperature detecting circuit and the emitting module, wherein the time signal is transmitted via the emitting module; and
   a reader, comprising:
      a reader antenna, receiving the time signal;
      a transforming circuit, receiving the time signal from the reader antenna, and transforming the time signal into a temperature signal; and
      a control circuit, electrically connected to the transforming circuit and the reader antenna,
   wherein the temperature detecting circuit comprises a temperature retardation unit, a reference unit and a comparison unit, the comparison unit is electrically connected to the temperature retardation unit and reference unit, the tag chip is electrically connected to the temperature retardation unit, the reference unit and the comparison unit, and when the tag chip sends a pulse signal into the temperature retardation unit and the reference unit, the temperature retardation unit generates a retardation signal according to the pulse signal, the reference unit generates a reference signal according to the pulse signal, and the comparison unit generates the time signal according to the retardation signal and the reference signal.

2. The RFID system as claimed in claim 1, wherein the tag chip controls the emitting module emitting a tag signal, and the reader antenna and the control circuit receive and read the tag signal.

3. The RFID system as claimed in claim 2, wherein the RFID tag is a passive RFID tag.

4. The RFID system as claimed in claim 3, wherein the RFID tag further comprises a tag antenna, the tag antenna is electrically connected to the tag chip, the control circuit control the reader antenna emits a tag request signal, and the tag antenna receives the tag request signal inducing the tag chip to generate the tag signal.

5. The RFID system as claimed in claim 4, wherein the control circuit controls the reader antenna emitting a temperature request signal, and the tag antenna receives the temperature request signal inducing the tag chip to generate the time signal from the temperature detecting circuit.

6. The RFID system as claimed in claim 2, wherein the RFID tag is an active RFID tag.

7. The RFID system as claimed in claim 1, wherein the temperature retardation unit comprises a field effect transistor, a capacitor and a first NOT gate, the capacitor and the first NOT gate are electrically connected to the field effect transistor, and when the pulse signal enters the temperature retardation unit, the field effect transistor is cut-off, an input current is provided to the capacitor to linear charge the capacitor, the tag chip provides an input voltage to the first NOT gate, and the temperature retardation unit outputs the retardation signal when the input voltage exceeds a threshold voltage of the first NOT gate.

8. The RFID system as claimed in claim 7, wherein the reference unit comprises a second NOT gate, and the pulse signal enters the second NOT gate to be transformed into the reference signal.

9. The RFID system as claimed in claim 8, wherein the comparison unit comprises a NAND gate, the NAND gate outputs the time signal according to the reference signal and the retardation signal.

10. The RFID system as claimed in claim 1, wherein the temperature retardation unit comprises a bipolar transistor, a capacitor and a NOT gate, the capacitor and the NOT gate are electrically connected to the bipolar transistor, and when the pulse signal enters the temperature retardation unit, the bipolar transistor is switched on, the pulse signal provides an input current to the capacitor to linear charge the capacitor, an input voltage is provided to the NOT gate, and the temperature retardation unit outputs the retardation signal when the input voltage exceeds a threshold voltage of the NOT gate.

11. The RFID system as claimed in claim 10, wherein the pulse signal enters the reference unit to be directly transformed into the reference signal.

12. The RFID system as claimed in claim 10, wherein the comparison unit comprises a NAND gate, and the NAND gate outputs the time signal according to the reference signal and the retardation signal.

13. The RFID system as claimed in claim 1, wherein the transforming circuit comprises a logical unit, a decaying unit and a counter, the logical unit is electrically connected to the decaying unit, the decaying unit is electrically connected to the counter, the time signal passes the logical unit into the decaying unit, the decaying unit reduces a time period of the time signal to generate a feedback signal, the feedback signal is fed into the logical unit, and the counter outputs the temperature signal according to a number of feedback times of the feedback signal.

14. The RFID system as claimed in claim 13, wherein the logical unit comprises an AND gate and an OR gate, the AND gate is electrically connected to the OR gate, the time signal passes the AND gate entering the decaying unit, and the feedback signal enters the logical unit from the decaying unit, passing the AND gate and the OR gate, and is output from the OR gate to be re-fed into the decaying unit.

15. The RFID system as claimed in claim 13, wherein the decaying unit comprises a plurality of NAND gates, and the NAND gates are serially connected.

16. An RFID tag, comprising:
an emitting module;
a temperature detecting circuit, producing a time signal according to a surrounding temperature, wherein the time signal changes with the surrounding temperature; and
a tag chip, electrically connected to the temperature detecting circuit and the emitting module, wherein the time signal is transmitted via the emitting module,
wherein the temperature detecting circuit comprises a temperature retardation unit, a reference unit and a comparison unit, the comparison unit is electrically connected to the temperature retardation unit and reference unit, the tag chip is electrically connected to the temperature retardation unit, the reference unit and the comparison unit, and when the tag chip sends a pulse signal into the temperature retardation unit and the reference unit, the temperature retardation unit generates a retardation signal according to the pulse signal, the reference unit generates a reference signal according to the pulse signal, and the comparison unit generates the time signal according to the retardation signal and the reference signal.

17. The RFID tag as claimed in claim 16, wherein the tag chip controls the emitting module emitting a tag signal.

18. The RFID tag as claimed in claim 16, wherein the RFID tag is a passive RFID tag.

* * * * *